(12) United States Patent
Sayko

(10) Patent No.: US 9,294,515 B2
(45) Date of Patent: Mar. 22, 2016

(54) METHOD OF CONTROLLING SESSION INITIATION PROTOCOL SESSIONS WITH STATE CHARTS

(71) Applicant: GENESYS TELECOMMUNICATIONS LABORATORIES, INC., Daly City, CA (US)

(72) Inventor: Slava Sayko, Walnut Creek, CA (US)

(73) Assignee: GENESYS TELECOMMUNICATIONS LABORATORIES, INC., Daly City, CA (US)

(*) Notice: Subject to any disclaimer, the term of this patent is extended or adjusted under 35 U.S.C. 154(b) by 349 days.

(21) Appl. No.: 13/672,625

(22) Filed: Nov. 8, 2012

(65) Prior Publication Data

US 2014/0129726 A1    May 8, 2014

(51) Int. Cl.
*G06F 15/16*    (2006.01)
*H04L 29/06*    (2006.01)

(52) U.S. Cl.
CPC .......... *H04L 65/1006* (2013.01); *H04L 65/105* (2013.01)

(58) Field of Classification Search
None
See application file for complete search history.

(56) References Cited

U.S. PATENT DOCUMENTS

| | | | |
|---|---|---|---|
| 8,306,021 B2* | 11/2012 | Lawson et al. | 370/352 |
| 2006/0149811 A1* | 7/2006 | Bennett et al. | 709/203 |
| 2009/0119381 A1* | 5/2009 | Bakker et al. | 709/206 |
| 2010/0211660 A1* | 8/2010 | Kiss et al. | 709/221 |
| 2010/0211678 A1* | 8/2010 | McDysan et al. | 709/225 |
| 2011/0029812 A1* | 2/2011 | Lu et al. | 714/18 |
| 2011/0255446 A1* | 10/2011 | Potts et al. | 370/260 |
| 2013/0191185 A1* | 7/2013 | Galvin | 705/7.37 |

* cited by examiner

*Primary Examiner* — Ranodhi Serrao
(74) *Attorney, Agent, or Firm* — Lewis Roca Rothgerber Christie LLP

(57) ABSTRACT

A method involves acts of receiving a Session Initiation Protocol (SIP) request, initiating by a computing device having a processor, a SIP session as a result of receiving the SIP request, executing, by the processor, a state chart implemented in the SIP server, communicating events by the computing device to the state chart, as the events occur in the SIP session, and changing states in the SIP session by the computing device, as the states are defined in the state chart, to completion of the SIP session.

20 Claims, 5 Drawing Sheets

METHOD OF CONTROLLING SESSION INITIATION PROTOCOL SESSIONS WITH STATE CHARTS

FIELD

This disclosure generally relates to the technical area of telephony, and pertains more particularly to control of Session Initiation Protocol (SIP) sessions.

BACKGROUND

Voice over IP (VOIP) network elements and applications that support SIP protocol, such as for example SIP Proxy, SIP Back-to-Back User Agent (B2BUA), SIP Media Gateway (MGW) and SIP Session Border Controller (SBC), may require a significant level of flexibility in terms of how individual SIP Messages, SIP Transactions or SIP Dialogs should be processed. This includes, but is not limited to, analysis of SIP message attributes, applying pre-defined business rules, manipulation of SIP Uniform Resource Identifiers (URIs) and headers, querying external storage and so on. This situation may lead to very complex implementations of SIP applications, with lots of configuration options and complex code, just to make it possible to address business needs in a particular deployment of a SIP application. To deal with this issue, some SIP applications provide more flexibility by allowing definition of some business logic using scripting languages, which may be either open source or proprietary. Such scripting capabilities, however, may provide only restricted access to properties of SIP messages, transactions or dialogs, as well as the fact that scripting can only be invoked at certain specific acts of SIP session processing. This conventional solution may not allow monitoring and control throughout the management of SIP sessions.

What is needed is a system and method that decouples business logic of SIP sessions processing from the actual SIP protocol implementation.

SUMMARY

In some implementations a method is provided, comprising acts of receiving a Session Initiation Protocol (SIP) request, initiating by a computing device having a processor, a SIP session as a result of receiving the SIP request, executing, by the processor, a state chart implemented in the SIP server, communicating events by the computing device to the state chart, as the events occur in the SIP session, and changing states in the SIP session by the computing device, as the states are defined in the state chart, to completion of the SIP session. The state chart may be implemented in some implementations in an extensible markup language (XML).

In some implementations the method may further comprise accessing, by the state chart, data from individual events, using the data in preparing input parameters invoking state chart extensions, and manipulating and storing the data using scripting capabilities. In other implementations the method may further comprise creating, by a Proxy Request extension, a client transaction and proxy request to a specified destination, creating, by a Proxy Response extension, a proxy response from a client transaction to a server transaction, cancelling, by a Cancel extension, a client transaction, and sending, by a Response extension, a specified response in a server transaction. In some implementations the method may further comprise invoking, by the state chart, an additional action in course of the SIP session, in some other implementations invoking an additional action querying an external data source, and calling external services via an application programming interface (API), which in some implementations may utilize Representational State Transfer (REST) for the API.

In some implementations operation of the state chart may be continued after r the SIP Session is finished, performing post-processing tasks, and in still others communicating between SIP sessions by the state chart sending events between sessions, thus enabling coordinated SIP session processing.

In another aspect of the invention an apparatus is provided, comprising a processor and a memory, the memory storing instructions that when executed by the processor, may cause the processor to receive a Session Initiation Protocol (SIP) request, initiate a SIP session as a result of receiving the SIP request, execute a state chart implemented in the SIP server, communicate events to the state chart, as the events occur in the SIP session, and change states in the SIP session, as the states are defined in the state chart, to completion of the SIP session. In some implementations of the apparatus the state chart is implemented in an extensible markup language (XML).

In some implementations of the apparatus the instructions may further cause the processor to access data from events, use the data in preparing input parameters for invoking extensions, and manipulate and stores the data using scripting capabilities.

In some further implementations the instructions may further cause the processor to create a client transaction and proxy request to specified destination using a PROXY REQUEST extension, create a proxy response from a client transaction to a server transaction using a PROXY RESPONSE extension, cancel client transaction using a CANCEL extension, and send a specified response using a RESPONSE extension.

The instructions may further cause the processor to invoke an additional action in course of SIP session processing. Additional actions may comprise querying an external data source or calling other services via an application programming interface (API). The API may comprise Representational State Transfer (REST).

In some implementations of the apparatus the instructions may cause the processor to continue operation of the state chart after the SIP Session is finished, performing post-processing tasks. Also in some implementations the instructions may cause the processor to enable SIP sessions to communicate by sending events to one another, thus enabling coordinated SIP session processing.

In yet another implementations an apparatus is provided comprising a processor and a memory, the memory storing instructions that when executed by the processor, cause the processor to execute a state chart, receive a Session Initiation Protocol (SIP) request from an origination, determine a primary destination and transmit the SIP request to the primary destination, receive a successful response from the primary destination, propagate the successful response back to the origination, receive an acknowledgement from the origination, propagate the acknowledgement to the primary destination, and connect the origination and the destination. In some implementations of the apparatus, in the event of an error in sending the request to the primary destination, or a busy signal at the primary destination, the instructions may cause the processor to determine an alternative destination and send the request to the alternative destination, receive a successful response from the alternative destination, propagate the successful response back to the origination, receive an acknowledgement from the origination, propagate the acknowledgement to the primary destination, and connect the origination and the alternative destination. In some of these implementations the instructions may cause the processor to receive an error response from the alternative destination and terminate activity of the system for the SIP request.

In some implementations of the apparatus the instructions may cause the processor to implement call control functions with a first software-implemented state chart coded in an extensible markup language (SCXML), and implement specific functionality beyond basic call-control functions with a second SCXML state chart.

DETAILED DESCRIPTION

Figure 1:
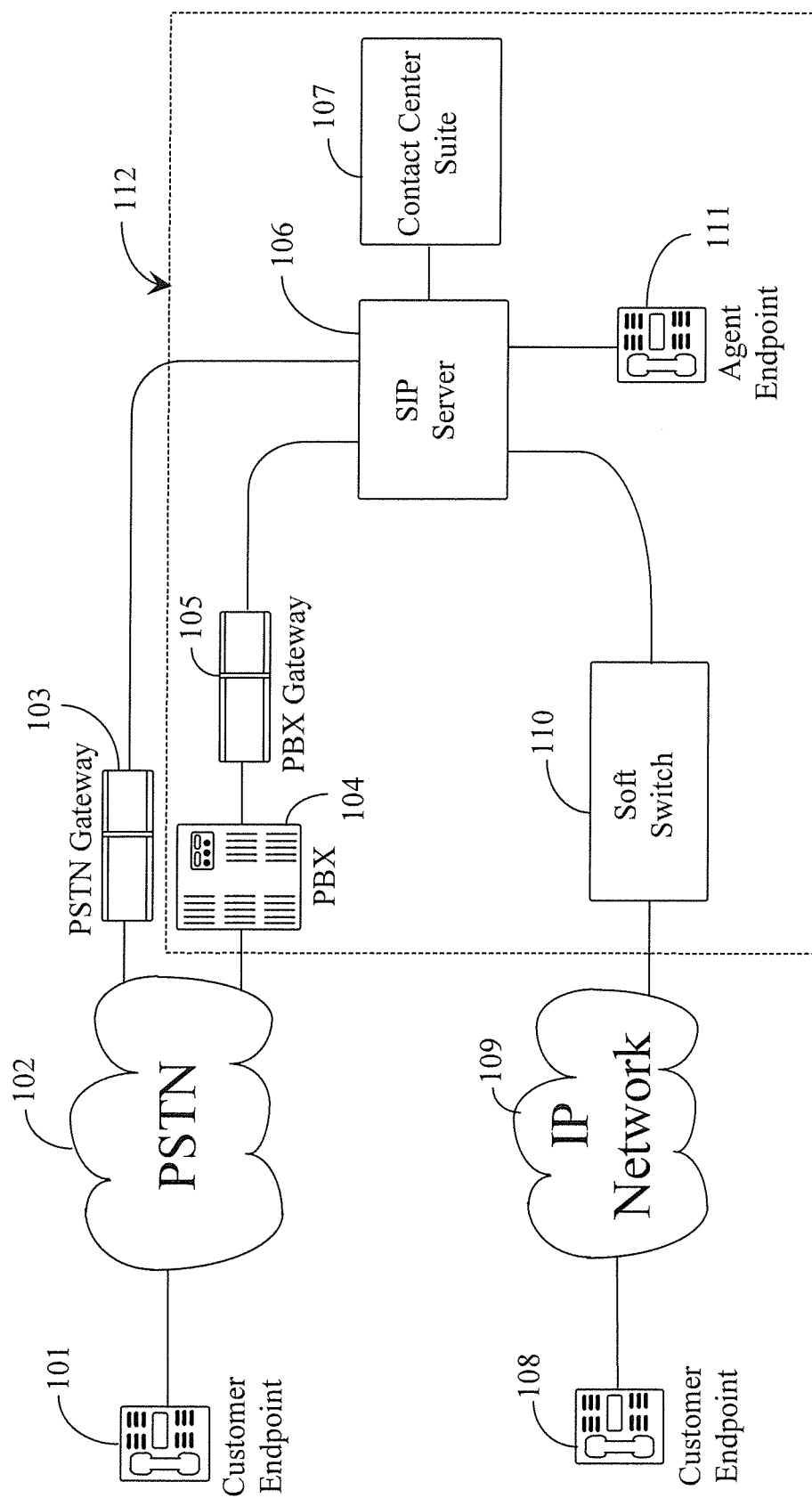
FIG. 1 is an architecture diagram within which implementations may be practiced.

Session Initiation Protocol (SIP) is an Internet Engineering Task Force (IETF)-defined signaling protocol widely used for controlling communication sessions such as voice and video calls over Internet Protocol (IP). The protocol can be used for creating, modifying and terminating two-party (unicast) or multiparty (multicast) sessions. Sessions may consist of one or several media streams. Other SIP applications include video conferencing, streaming multimedia distribution, instant messaging, presence information, file transfer and online games. The SIP protocol is an Application Layer protocol designed to be independent of the underlying Transport Layer; it can run on Transmission Control Protocol (TCP), User Datagram Protocol (UDP), or Stream Control Transmission Protocol (SCTP). It is a text-based protocol, incorporating many elements of the Hypertext Transfer Protocol (HTTP) and the Simple Mail Transfer Protocol (SMTP).

SIP functionality may be implemented in software executing from one or more processors in a computing appliance often termed a SIP Server in the art, the server sending and receiving messages in the SIP protocol. SIP software may be provided by a variety of suppliers, and there are, as may be true in most software environments, a broad variety of ways in which the various SIP functions may be coded. Still, to be useful in the industry, the software must adhere to the protocol, and be executable on a wide variety of computing platforms.

Voice over Internet Protocol (VoIP) network elements and applications that support SIP protocol, such as, for example, SIP Proxy, SIP Back-to-Back User Agent (B2BUA), SIP Media Gateway (MGW), and SIP Session Border Controller (SBC) may require a significant level of flexibility in terms of how individual SIP Messages, SIP Transactions or SIP Dialogs should be processed. This may include, but is not limited to, analysis of SIP messages attributes, applying pre-defined business rules, manipulation of SIP Universal Resource Indicators (URIs) and headers, querying external storage and so on. All of this functionality may be implemented in software in a variety of ways, and may result in very complex implementations of SIP applications, with lots of configuration options and complex code to address business needs in particular deployments of SIP application. Though some SIP applications may provide some level of flexibility by use of scripting languages (either open source or proprietary, these approaches may provide only restricted access to properties of SIP messages, transactions or dialogs. Also scripting may only be invoked only at certain specific steps of SIP Session processing, which may not allow to monitoring and control of SIP sessions from beginning to end. The present inventors provide a unique solution implementing SIP session processing with tight control of a state chart.

In some implementations, a flexible and customizable asynchronous method is provided to control Session Initiation Protocol (SIP) sessions by use of State Charts (Harel state charts) defined with a State Chart Extensible Markup Language (SCXML). In some implementations, the result is a SIP-SCXML protocol that may operate as a state machine, performing all of the necessary acts and auxiliary tasks, including advancing states until the SIP session is concluded.

SIP communication server may be deployed in a variety of circumstance in a variety of different architectures. Some of such architectures may be particular to SIP application to communication center architecture implementing communication between callers and agents of a contact center (CC), such as, for example, a CC hosted for an airline or a financial institution. Contact center architecture, however, is not a limitation to implementations of the present invention, but merely an example of implementation.

FIG. 1 is an architecture diagram illustrating a generalized architecture comprising a landline network 102 and an IP network 109 through which customers of a contact center 112 may connect to agents of the contact center using SIP services enabled through a Session Initiation Protocol (SIP) Server 106, facilitating connection between the customers and the agents of the contact center. A customer using a landline telephone appliance 101 connects through the landline network (e.g., PSTN) 102 through either PSTN gateway 103 to SIP Server 106, or through a PBX 104 and then a PBX gateway 105 to SIP Server 106. SIP functions provide final connection between the appliance 101 and the agent's appliance 111. A customer using a SIP enabled appliance 108 connects through IP network 109 and a softswitch 110 to SIP server 106, which provides final connection to the agent's appliance 111.

FIGS. 2a through 2e illustrate some alternative architecture implementations for a SIP communication Server. SIP messages that a Communication Server sends or receives may be quite similar in different configurations, but depending on the deployment configuration, the destination to which the Communication Server sends SIP requests may be different. This mostly applies to the routing of INVITE messages—other messages may follow the path established by INVITE.

Figure 2A:
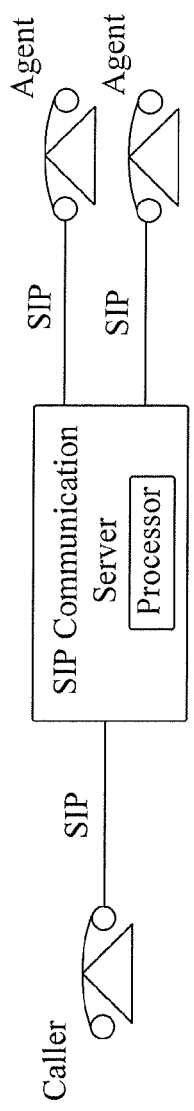
FIGS. 2a through 2e illustrate SIP Communication Server architecture with soft switches in a variety of use cases.

FIG. 2a illustrates a stand-alone implementation wherein the Communication Server is the only SIP server between the Caller and Agent phones. In this case Communication Server may send all messages to the addresses of the Caller/Contact Center addresses. The addresses could be retrieved from either (a) static configuration in a configuration layer, which may be useful for Agent phones in a Contact Center implementation, or (b) a lookup in a local Registry. For example if an Agent destination number (DN) is defined, for example, as agent1@company.com, and a SIP phone has registered this SIP URI in the Registry as 1077@192.168.2.55, INVITE may be sent to IP address 192.168.2.55.

Figure 2B:
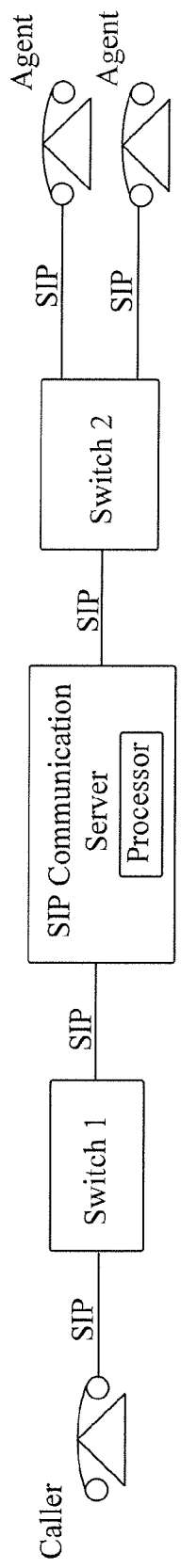

FIG. 2b illustrates a middle proxy implementation wherein multiple soft switches may be deployed, in this example one ahead of and one behind the SIP Communication Server. In this implementation, for each call, the Communication Server may have to find the proper destination soft switch to which to send the INVITE message. For example, for inbound calls to agents, the IP address of the switch could be written as a static configuration. For outbound calls from agents to customers a dial plan-type configuration table may be needed. For example: "All calls with destination number starting on 415 should be sent to switch at IP address 192.168.8.217." This task may be offloaded to a third-party proxy; then the Communication Server may only have to be configured with a single destination for all non-local addresses.

Figure 2C:
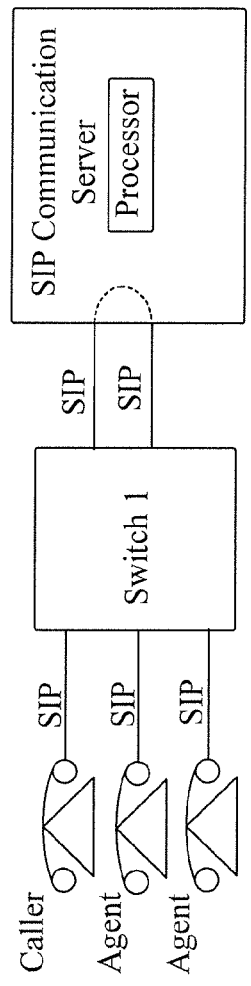

FIG. 2c illustrates an implementation in which the Communication Server is deployed as an application server behind a soft switch. In this case the Communication Server communicates with a single soft switch, and is configured to send all INVITE requests to the IP address of the soft switch.

Figure 2D:
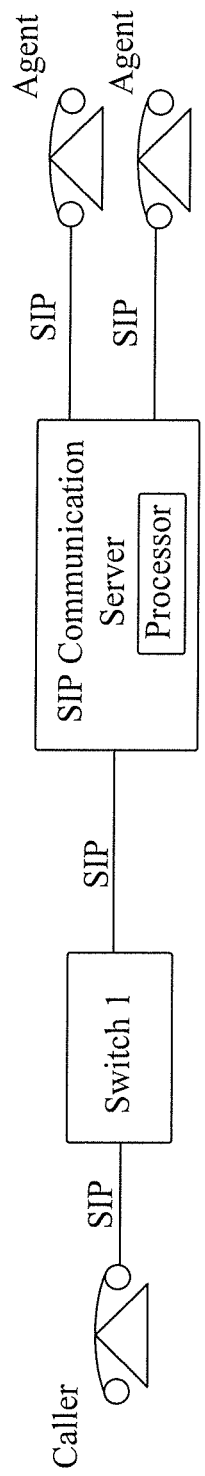

FIG. 2d illustrates an implementation in which a soft switch is deployed between the Communication Server and caller phones, but agent phones communicate directly with the Communication Server. For outbound calls from agents to customers a dial plan-type configuration table may be needed, as described above for FIG. 2b. For inbound calls to agents the rules described above regarding FIG. 2a may be used.

Figure 2E:
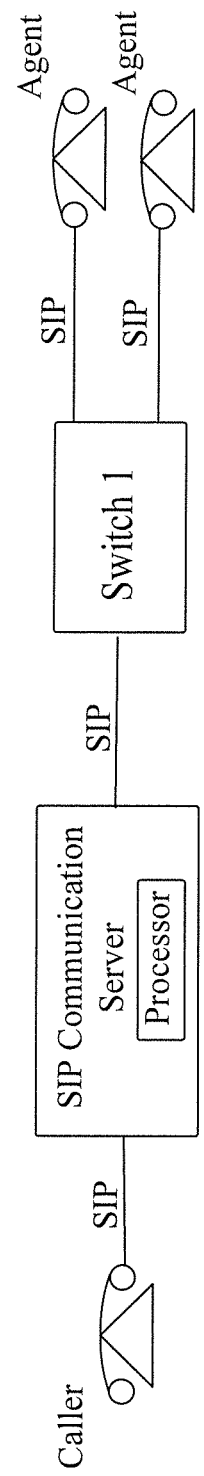

FIG. 2e illustrates an implementation in which a soft switch is deployed between the Communication Server and agent phones, but caller phones may communicate directly with Communication Server. For inbound calls to agents the rules described for FIG. 2b may apply. For outbound calls from agents the rules described at FIG. 2a are appropriate.

Figure 3:
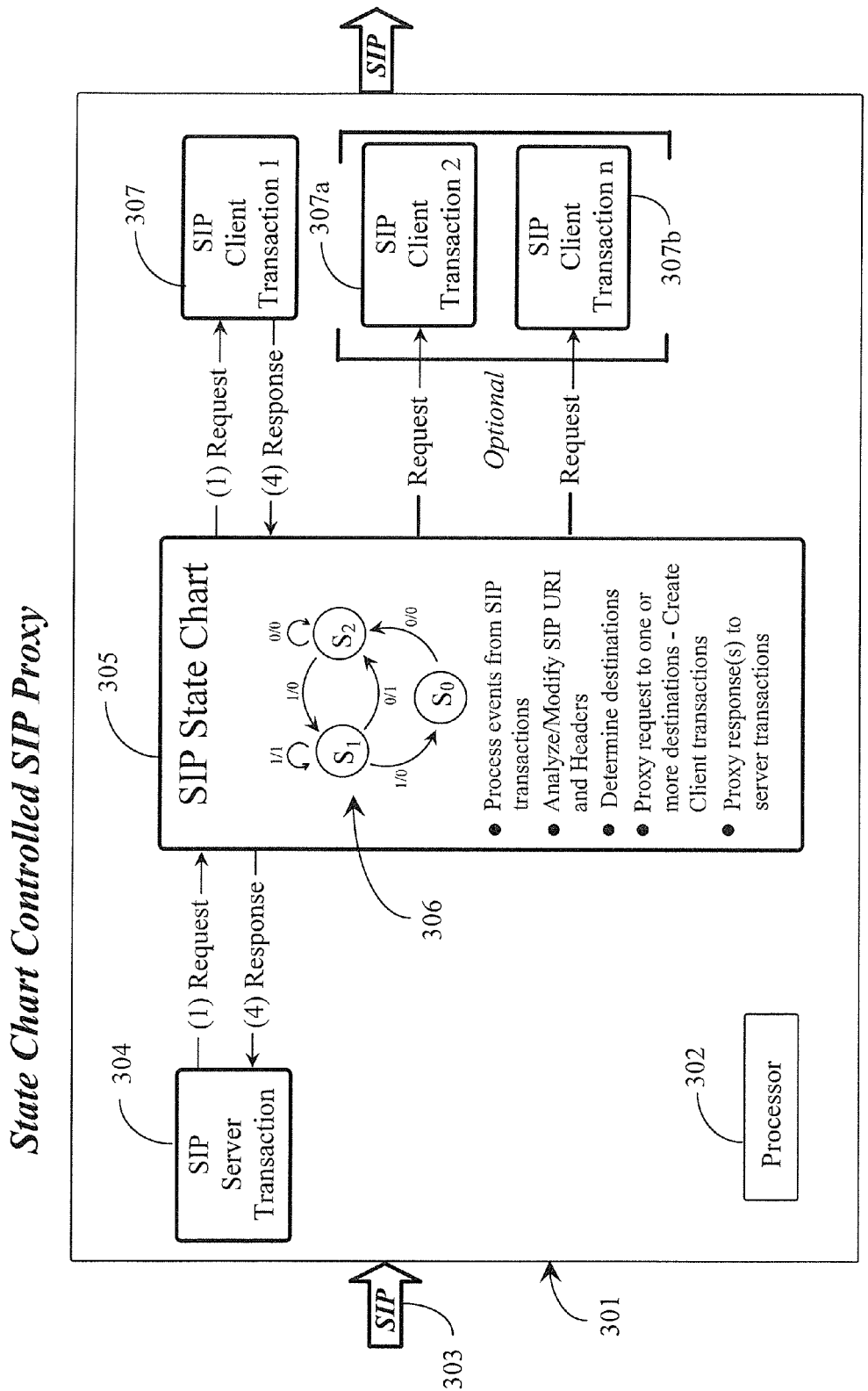
FIG. 3 is a diagram illustrating a controlled SIP proxy operation according to some example implementations.

FIG. 3 is a high-level diagram illustrating an implementation in which a software-implemented SIP State Chart 305 is shown operating in a SIP server 301 with a processor 302 and controlling SIP sessions 303 according to some example implementations. A SIP transaction 304 is created in response to an incoming SIP call and initiates a request, which is an event, to SIP State Chart 305. As indicated in the diagram 306, in some implementations, SIP State Chart 305 may process all events from SIP transactions, analyze and modify (e.g., as needed) SIP Universal Resource Indicators (URIs) and headers, determine destinations, send proxy requests to one or more destinations, and create, for example, client transactions that may be necessary, such as client transaction 307 and optional client transactions 307a and 307b.

In some implementations State Chart 305 may be coded in an extensible Markup Language (XML) which provides functionality of a state chart, which may be termed a State Chart XML (SCXML) in the art.

Figure 4:
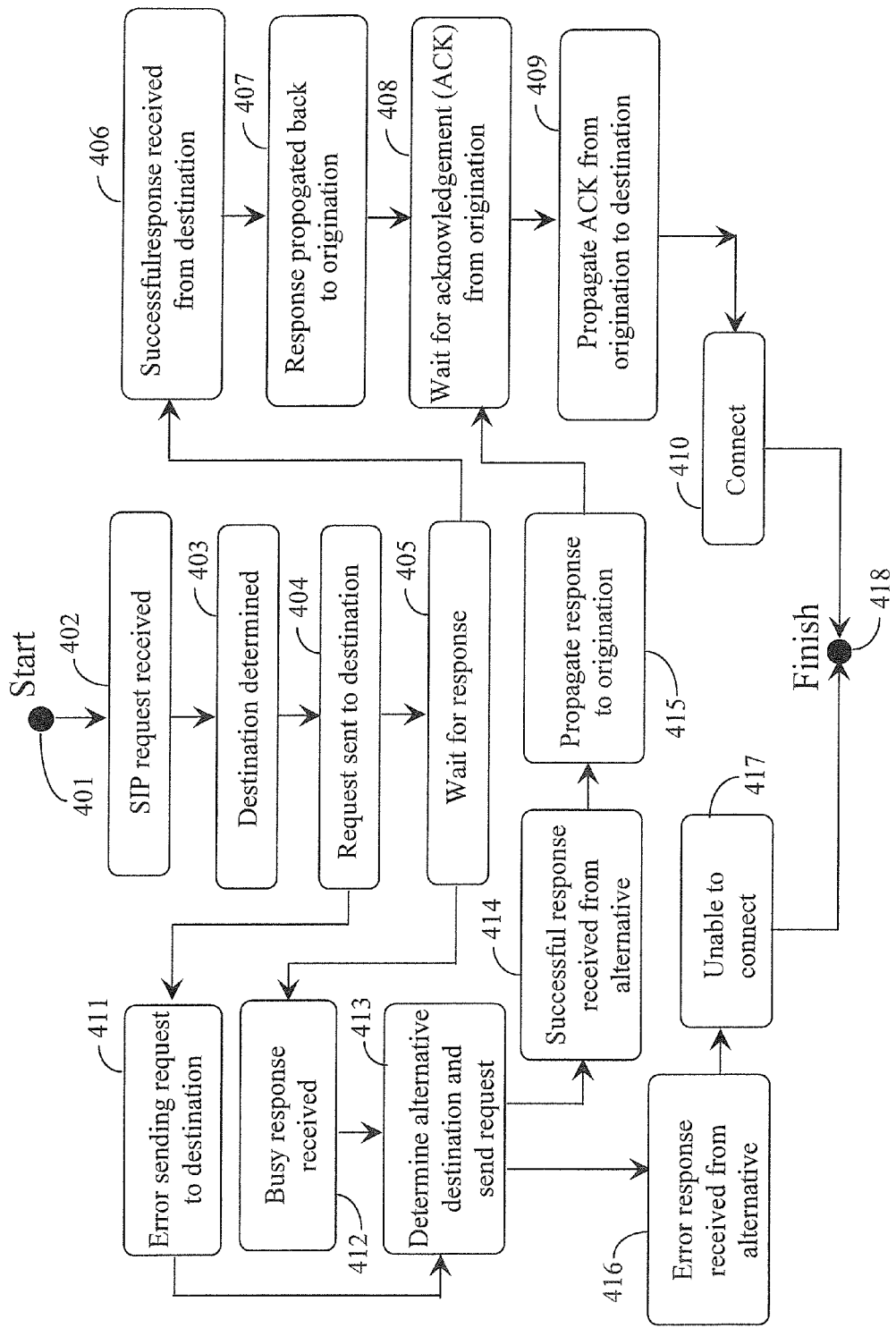
FIG. 4 is a flow chart depicting control flow in SIP processing according to some example implementations.

FIG. 4 is a flow diagram that illustrates acts and states in example processing of a SIP session according to some implementations. In some implementations, the application of the SIP State Chart 305 of FIG. 3 may implement the SIP session processing. According to the example, the process starts at 401. A SIP request is received at act 402. The state chart operation determines the primary destination at act 403 and sends the request to the destination at act 404. If there is an error in sending the request to the primary destination (act 411), at act 413 an alternative destination is determined and the request is sent to the alternative destination. At act 416, if an error response is received from the alternative destination, the system is unable to connect (act 417), and the processing ends (418).

If at act 404 there is no error, the system waits at act 405 for a response from the primary destination. If a busy response is received from the primary destination (act 412) control goes again to act 413 where an alternative destination is determined and the request is sent to the alternative destination. If an error response is received from the alternative destination, as described above, then the system is unable to connect at act 417, and the process is finished—i.e., processing ends (418).

For either path arriving at act 413, if a successful response is received from the alternative destination (act 414), then the response is propagated back to origination at act 415, the system waits for ACK from origination at act 408, the ACK received is propagated to the destination at act 409, and connection is accomplished at act 410.

If at act 405 (wait for response) a successful response is received at act 406 from the original destination, then at act 407 the response is propagated back to the origination. The system waits for acknowledgement from the origination at act 408, and propagates the acknowledgement from the origination to the primary destination at act 409. The system connects the origination and primary destination at act 410, and the process is finished at 418.

In some implementations, this process may be constrained just as in a state machine, and at each succeeding state business logic may be applied before that state changes, such as, for example, analysis of SIP message attributes, applying pre-defined business rules, manipulation of SIP Uniform Resource Identifiers (URIs) and headers, querying external storage and so on.

In some implementations, an SIP State Chart application defines SIP session processing business logic that, for example, processes events, changes states based on the events, and executes any necessary actions on SIP sessions as a session passes from state to state.

Some characteristics of a SIP State Chart application according to some implementations may include:

I. The SIP State Chart application processes Events. The events are defined as notifications about what happens on the SIP protocol layer. For example, the following events may be exposed to the State Chart by the SIP transaction Layer:

(a) REQUEST—a SIP request is received by SIP server transaction (b) RESPONSE—SIP response is received by SIP client transaction (c) TIMEOUT—Timeout occurred on SIP client transaction (d) TRANSPORT ERROR—a transport error occurred on SIP client transaction (e) ACK—ACK is received on SIP server transaction This small number (5) of event types in some implementations may represent all types of activities on the SIP transaction layer, and may be sufficient to define an SIP State Chart that describes business logic in processing SIP transactions. In other implementations there may be more or fewer event types.

II. Events that are sent to the SIP State Chart application by the SIP protocol layer may have data associated with the events. This data may generally include information about SIP messages, transactions, and dialogs. The SIP State Chart application may access this data, manipulate this data, and store this data using scripting capabilities available in the State Chart, for example, using JavaScript.

III. The SIP State Chart application may execute actions on SIP sessions by invoking SIP extensions. SIP extensions allow performance of specific actions on the SIP protocol level. For example, the following actions (SIP extensions) may be defined in one implementation for the SIP transaction layer:

(a) PROXY REQUEST—create client transaction and proxy request to specified destination (b) PROXY RESPONSE—proxy response from client transaction to server transaction (c) CANCEL—cancel client transaction (d) RESPONSE—send specified response in the server transaction.

The SIP State Chart application may use data received with the events to prepare input parameters for invoking SIP extensions. For example, SIP request URI may be analyzed to determine proper destination for this SIP request, and a calculated destination would then be supplied to PROXY REQUEST SIP extension.

IV. The SIP State Chart application may in some implementations process a SIP session from beginning to end, processing all corresponding events from the SIP protocol layer in context of the same session. The SIP State Chart application may invoke any additional actions in course of a SIP session processing, such as querying an external data source or calling other services via an application programming interface (API), which may utilize Representational State Transfer (REST). The SIP State Chart application may in some implementations continue operation after the SIP Session is finished, for example to perform post-processing. SIP sessions may communicate with each other by sending events to each other, thus enabling coordinated SIP session processing.

V. In some implementations, the SIP State Chart application is executed completely asynchronously, based on the events in the order received from the SIP Protocol layer.

In some implementations scripting capabilities (such as JavaScript) enable access to SIP protocol layer data, and may conveniently program business logic of necessary complexity. Using scripting, in some implementations, it is possible to store needed information in the data model, and use the stored information when a next event from a SIP session being processed arrives.

In some implementations, a SIP State Chart session is started when a first event about a SIP session is received, and from that point forward the SIP State Chart may be associated with the SIP Session, and process all events within the SIP Session. For example, a SIP State Chart session may be started when a new SIP server transaction is created for a received SIP Request. The SIP State Chart may then create one or more SIP client transactions, and process events coming from the SIP client transactions until they are finished.

In some implementations, SIP sessions may exchange data. The data may be exchanged either in real-time between running SIP sessions or off-line via persistent storage. This allows addressing cases when the same SIP session passes multiple times though the SIP application, and in this case stored context can be used to perform subsequent processing of the same SIP session.

In some implementations, as described above, one SIP State Chart may provide complete control of a SIP session from beginning to end.

In some implementations control may be divided between basic call-control capabilities in SIP, and the SIP State Chart application may provide added functionality. Also in some implementations, the SIP state chart may provide overall control in the sequencing of states based on events and event order, for example, and the basic call control functions may be provided external to the SIP State Chart application.

Here is an example of a SIP State Chart application implemented in XML (SCXML) according to an implementation:

```
<scxml version="1.0" xmlns="http://www.w3.org/2005/07/scxml"
       xmlns:sip="http://www.genesyslab.com/modules/sip"
       xmlns:ws="http://www.genesyslab.com/modules/ws"
    xmlns:session="http://www.genesyslab.com/modules/session"
    _persist="false" >
    <initial>
            <transition target="listening">
            </transition>
    </initial>
    <state id="main" initial="listening">
    <state id="listening">
        <transition event="sip.request" target="request">
            <log expr="'Got event:' + _event.name"/>
            <log expr="'request.method=' + _event.data.request.method"/>
            <log expr="'request.uri=' + _event.data.request.uri"/>
            <log expr="'request.callid=' + _event.data.request.callid"/>
            <log expr="'request.headers[0]=' + _event.data.request.headers[0].name +
 ' : ' + _event.data.request.headers[0].value"/>
            <log expr="'request.headers[1]=' + _event.data.request.headers[1].name +
 ' : ' + _event.data.request.headers[1].value"/>
            <log expr="'request.headers[2]=' + _event.data.request.headers[2].name +
 ' : ' + _event.data.request.headers[2].value"/>
            <log expr="'request.headers[3]=' + _event.data.request.headers[3].name +
 ' : ' + _event.data.request.headers[3].value"/>
            <log expr="'request.headers[4]=' + _event.data.request.headers[4].name +
 ' : ' + _event.data.request.headers[4].value"/>
            <log expr="'request.headers[5]=' + _event.data.request.headers[5].name +
 ' : ' + _event.data.request.headers[5].value"/>
            <log expr="'request.headers[6]=' + _event.data.request.headers[6].name +
 ' : ' + _event.data.request.headers[6].value"/>
            <log expr="'request.body=' + _event.data.request.body"/>
        </transition>
    </state>
    <state id="request">
        <onentry>
            <script>
            var i=1;
            </script>
        </onentry>
        <transition event="request.getstatename">
            <log expr="'Got event:' + _event.name"/>
        </transition>
```

```
            <transition event="event.exit" target="exit">
                    <log expr="'Got event:' + _event.name"/>
            </transition>
        </state>
    </state>
    <final id="exit"/>
</scxml>
END!
```

It will be apparent in light of the teaching of this disclosure, that the state chart, in cooperation with the SIP transaction layer, provides a unique and convenient means to decouple business logic of SIP sessions processing from the actual SIP protocol implementation. It will also be apparent that the coding of a SIP state chart proxy for various applications may be accomplished in a variety of ways without departing from the spirit and scope of this disclosure, one of which is in XML.

What is claimed is:

1. A method, comprising:
receiving a Session Initiation Protocol (SIP) request;
initiating by a computing device having a processor, a first SIP session as a result of receiving the SIP request;
executing, by the processor, a state chart implemented in a SIP server;
communicating events by the computing device to the state chart, as the events occur in the first SIP session;
changing states in the first SIP session by the computing device, as the states are defined in the state chart, to completion of the first SIP session;
coordinating, by the processor, processing of the first SIP session and a second SIP session, wherein the first and second SIP sessions are concurrently running SIP sessions and the coordinating invokes the state chart for sending events between the first SIP session and the second SIP session;
storing, by the processor, data exchanged between the first SIP session and the second SIP session; and
using, by the processor, the data as context for subsequent processing of the first SIP session.

2. The method of claim 1 further comprising:
implementing the state chart in an extensible markup language (XML).

3. The method of claim 2, further comprising:
accessing, by the state chart, data from individual events;
using the data in preparing input parameters invoking state chart extensions; and
manipulating and storing the data using scripting capabilities.

4. The method of claim 3 further comprising:
creating, by a Proxy Request extension, a client transaction and a proxy request to a specified destination;
creating, by a Proxy Response extension, a proxy response from the client transaction to a server transaction;
cancelling, by a Cancel extension, the client transaction; and
sending, by a Response extension, a specified response in the server transaction.

5. The method of claim 1, further comprising:
invoking, by the state chart, an additional action in course of the first SIP session.

6. The method of claim 1 further comprising:
invoking an additional action querying an external data source; and
calling external services via an application programming interface (API).

7. The method of claim 6 further comprising:
utilizing Representational State Transfer (REST) for the API.

8. The method of claim 1 further comprising:
continuing operation of the state chart after the first SIP Session is finished, performing post-processing tasks.

9. An apparatus, comprising:
a processor and a memory, the memory storing instructions that when executed by the processor, cause the processor to:
receive a Session Initiation Protocol (SIP) request;
initiate a first SIP session as a result of receiving the SIP request;
execute a state chart implemented in a SIP server;
communicate events to the state chart, as the events occur in the first SIP session;
change states in the first SIP session, as the states are defined in the state chart, to completion of the first SIP session;
coordinate processing of the first SIP session and a second SIP session, wherein the first and second SIP sessions are concurrently running SIP sessions and the coordinating invokes the state chart for sending events between the first SIP session and the second SIP session;
store data exchanged between the first SIP session and the second SIP session; and
use the data as context for subsequent processing of the first SIP session.

10. The apparatus of claim 9 wherein the state chart is implemented in an extensible markup language (XML).

11. The apparatus of claim 9 wherein the instructions further cause the processor to:
access data from events;
use the data in preparing input parameters for invoking extensions; and
manipulate and store the data using scripting capabilities.

12. The apparatus of claim 11 wherein the instructions further cause the processor to:
create a client transaction and a proxy request to specified destination using a PROXY REQUEST extension;
create a proxy response from the client transaction to a server transaction using a PROXY RESPONSE extension;
cancel the client transaction using a CANCEL extension; and
send a specified response using a RESPONSE extension.

13. The apparatus of claim 9 wherein the instructions cause the processor to invoke an additional action in course of SIP session processing.

14. The apparatus of claim 13 wherein the instructions cause the processor to:

invoke additional actions comprising querying an external data source or calling other services via an application programming interface (API).

15. The apparatus of claim 14 wherein the API comprises Representational State Transfer (REST).

16. The apparatus of claim 9 wherein the instructions cause the processor to:
continue operation of the state chart after the first SIP Session is finished, performing post-processing tasks.

17. The apparatus of claim 9, wherein:
the instructions, when executed by the processor, further cause the processor to:
receive the Session Initiation Protocol (SIP) request from an origination;
determine a primary destination and transmit the SIP request to the primary destination;
receive a successful response from the primary destination;
propagate the successful response back to the origination;
receive an acknowledgement from the origination;
propagate the acknowledgement to the primary destination; and
connect the origination and the destination.

18. The apparatus of claim 17 wherein the instructions cause the processor to:
in the event of an error in sending the request to the primary destination, or a busy signal at the primary destination, determine an alternative destination and send the request to the alternative destination;
receive a successful response from the alternative destination;
propagate the successful response back to the origination;
receive an acknowledgement from the origination;
propagate the acknowledgement to the primary destination; and
connect the origination and the alternative destination.

19. The apparatus of claim 18 wherein the instructions cause the processor to:
receive an error response from the alternative destination; and
terminate activity of the apparatus for the SIP request.

20. The apparatus of claim 17 wherein the instructions cause the processor to:
implement call control functions with a first software-implemented state chart coded in an extensible markup language (SCXML); and
implement specific functionality beyond basic call-control functions with a second SCXML state chart.

* * * * *